United States Patent [19]

Ishikawa

[11] 3,827,408
[45] Aug. 6, 1974

[54] ROTARY COMBUSTION ENGINE
[75] Inventor: Yoshikazu Ishikawa, Tokyo, Japan
[73] Assignee: Nisson Motor Company, Limited, Kanagawa-ku, Yokohama City, Japan
[22] Filed: May 24, 1973
[21] Appl. No.: 363,397

[30] Foreign Application Priority Data
June 2, 1972  Japan.............................. 47-54974

[52] U.S. Cl. .............................................. 123/8.13
[51] Int. Cl. .......................................... F02b 53/04
[58] Field of Search.................. 123/8.01, 8.13, 8.45

[56] References Cited
UNITED STATES PATENTS
3,476,092  11/1969  Yamamoto .................... 123/8.13 X Primary Examiner—Carlton R. Croyle
Assistant Examiner—Michael Koczo, Jr.

[57] ABSTRACT

A rotary combustion engine comprising primary and secondary intake ports formed in each of two side walls through which a primary and a secondary air-fuel mixture respectively are supplied into the engine, the primary port being covered by the rotor prior to the secondary port during operational rotation of the rotor.

3 Claims, 6 Drawing Figures

PRIOR ART

PATENTED AUG 6 1974

ROTARY COMBUSTION ENGINE

The present invention relates to rotary combustion engines and is particularly useful in connection with rotary combustion engines of the Wankel type.

Such a rotary combustion engine comprises a housing having a cavity therein and a rotor disposed within the cavity, the rotor being rotatable relative to the housing about an axis spaced from but parallel to the axis of the cavity. The housing has axially spaced end walls and a peripheral wall interconnecting the end walls to form the cavity, the inner surface of the peripheral wall having a multi-lobed profile which preferably is basically an epitrochoid. The rotor has end faces disposed adjacent to the housing end walls for sealing cooperation therewith, and has a peripheral surface with a plurality of circumferentially spaced apex portions, each such apex bearing a radially movable seal for sealing engagement with the inner surface of the peripheral wall to form a plurality of working chambers which vary in volume on relative rotation of the housing and rotor. Each such apex seal extends in an axial direction from one end face to the other of the rotor. The number of apexes will usually exceed the number of lobes of the epitrochoid by one.

For the purpose of introducing an air-fuel mixture and exhausting burned gases, there are provided in the housing gas inflow and outflow channels, the ports of which are overridden by the rotor. Internal combustion engines of this type have the advantage that they can be provided with intake ports of relatively large cross-section, which produces high volumetric efficiency and correspondingly high performance. Intake ports are mainly classified into two types, i.e., a peripheral port which opens into the cavity from the peripheral wall, and a side port which opens into the cavity from an end wall of the housing. The present invention specifically relates to an improvement of a side intake port configuration. Although it is advantageous to provide an intake port of larger cross-sectional area than an exhaust port, the profile of the intake port (see FIG. 2) is limited by the locus of a leading shoulder of an apex section of a side seal, the selected point of closing of the intake port, and measures designed to prevent mechanical deterioration and failure of the trailing shoulder portions of the apex sections of the side seal. It follows that the cross sectional area of the intake port cannot exceed the value determined by the above described limitations. In order to produce high volumetric efficiency and correspondingly high performance at high loads and to provide regular running of the engine under partial loads, it has been known in the art to provide a separate induction channel for operating under high loads, having a separate intake port disposed in an opposite end wall from a primary intake port, and at the same location, relative to the rotation of the rotor, as the primary intake port which communicates with a primary induction channel (see FIG. 1). Both the primary induction channel and secondary induction channels may be supplied from a carburetor, which opens the main induction channel only when the load on the engine exceeds some selected value. It is a common practice in this type of engine to adjust the carburetor and the intake ports so that the amounts of air-fuel mixture introduced through the primary induction channel and the secondary induction channel when the engine is running at maximum power and full load are in a ratio of substantially 1 : 2 respectively, in order to ensure economy in fuel consumption when the load on the engine is low and high power output when the load on the engine is high. However, since, in an engine of the above described type, the intake ports for the primary induction channel and the secondary induction channel are disposed in opposite side walls, the intake port for the primary induction channel is larger, in cross section, than required for partial load operation whereas the intake port for the secondary induction channel is insufficient in cross-section for effective partial load operation as well as full load operation. This is mainly because of the fact that the cross-sectional area of the intake port for the secondary induction channel cannot be made large enough. In the prior art engine, since the intake port for the primary induction channel is so disposed in the side wall that it is open to the cavity for a relatively long period of time when the engine speed is low under partial load, there is a tendency for a portion of the explosive charge to be transferred into the primary induction channel during this running condition of the engine, thus reducing the amount of fresh charge available for the working chamber. This causes irregular running of the engine under partial load.

The secondary intake port of a prior art engine has to be as large in cross-sectional area as possible in order to feed a sufficient amount of air-fuel mixture into the cavity in a relatively short period of time. The secondary induction channel correspondingly has to be as large in cross-sectional area as the secondary intake port. However, where the cross-sectional area of the secondary intake port is made large, the flow velocity in the secondary induction channel will decrease and thus a sufficient amount of air-fuel mixture will not be available when the load of the engine is low. This also causes irregular running of the engine under partial load.

The present invention eliminates these disadvantages by providing a primary induction channel with branch channels leading to each of the two end walls of the engine, each having an intake port in the end wall of relatively small cross-sectional area and providing a secondary induction channel with branch channels leading to each of the two end walls, each having a separate intake port of relatively larger cross-sectional area than the respective intake port communicating with the primary induction channel. The intake ports communicating with the primary induction channel are disposed at locations at which they are uncovered by the rotor for a relatively shorter period of time than the intake ports communicating with the secondary induction channel, preventing explosive charge from entering the primary induction channel and its branch channels when the engine is operating partial load.

Both the primary induction channel and the secondary induction channel may be supplied with air-fuel mixture from a carburetor, which opens the secondary induction channel only when the load on the engine exceeds a predetermined value. In the higher load regions the suction on the primary induction channel is low enough that only a proportionately trivial amount of explosive gas enters therein.

The invention will be more fully described with reference to the accompanying drawing, in which.

Figure 1:
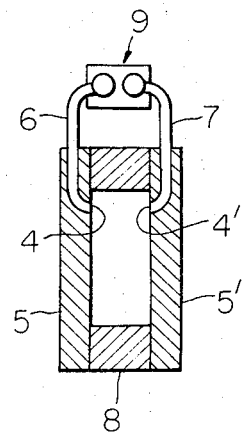
FIGS. 1 and 2 are diagrams illustrating the prior art considered above.
Figure 2:
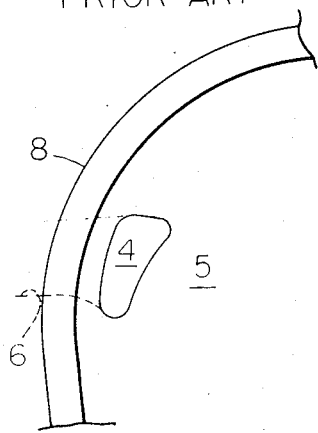
Figure 3:
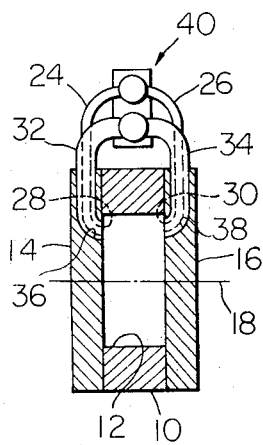
FIG. 3 is a diagram, in fragmentary section, of a rotary combustion engine with its rotor removed of one embodiment of the present invention.

Referring to FIGS. 1 and 2, there is shown therein the prior art considered above for comparison, in which an intake port 4 is formed in an end wall 5 of a rotary combustion engine (no numeral). A reference numeral 4' indicates a separate intake port in an other end wall 5'. As shown, a primary induction channel 6 and a secondary induction channel 7 are disposed in housing (no numeral) and communicate with the intake port 4 and the separate intake port 4', respectively. A reference numeral 8 indicates a peripheral wall of the housing. Both the primary induction channel 6 and the secondary induction channel 7 are supplied with air-fuel mixture from a carburetor 9, weich opens the induction channel 7 only when the load on the engine reaches some selected value.

An embodiment of the present invention will now be described with reference to FIGS. 3 to 6 inclusive.

There is shown a peripheral wall 10 having an inner surface 12 of multilobed form, preferably of basically epitrochoidal shape. The inner surface 12 defines, together with end walls 14 and 16, an internal cavity (no numeral) through which passes coaxial therewith a shaft 18 (shown as a broken line in FIG. 3), having an eccentric portion (not shown) disposed within the cavity. A multiapexed rotor 20 is rotatably mounted on the eccentric, in a conventional manner used in the Wankel type rotary combustion engine. The rotor 20 is povided with radially movable apex seals 22 (one of which only is shown), which continuously sealably slides along the inner surface 12 as the rotor 20 rotates in the direction of an arrow D, whereby three variable-volume working chambers are formed thereby, only one of them being shown and indicated by a reference symbol A. Extending to the end walls 14 and 16, there are respectively provided primary induction branch channels 24 and 26 for fresh air-fuel mixture having ports 28 and 30, respectively, opening into the inner surface 12 through the end walls 14 and 16. Also provided extending to the end walls 14 and 16 are secondary induction channels 32 and 34 having intake ports 36 and 38 opening into the inner surface 12 through the end walls 14 and 16, respectively.

Figure 4:
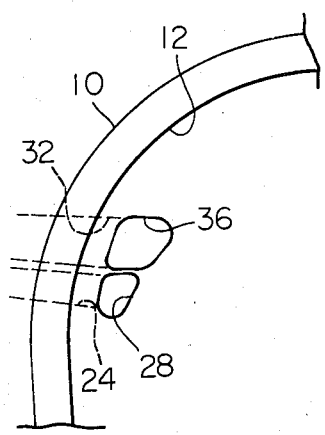
FIG. 4 is a fragmentary sectional view, and shows the position and configuration of intake ports in one end wall of the rotary combustion engine shown in FIG. 3.

Referring particularly to FIG. 4, there is shown the primary intake port 28 having a relatively smaller cross-sectional area than the secondary intake port 36. It is necessary that the ratio of the cross-sectional areas of the primary and secondary intake ports 28 and 36 respectively be so determined that it corresponds to that of the respective amounts of air-fuel mixture required to be drawn through the primary and secondary induction channels 24 and 32 respectively for effective operation of the engine.

Figure 5:
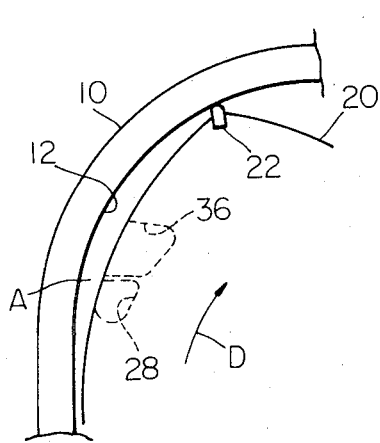
FIGS. 5 and 6 are fragmentary sectional views, and show various positions of the rotor relative to the intake ports.
Figure 6:
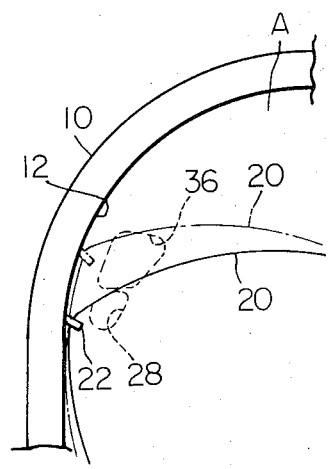

The primary intake ports 28 and 30 and the secondary intake ports 36 and 38 are disposed in the end walls 14 and 16 respectively at locations such that they are uncovered by the rotor 20 during the engine operating cycle only after the exhaust cycle in the working chamber A has been completed. This is shown in FIG. 5 by a solid-line position of the rotor 20, wherein the primary and secondary intake ports 28 and 36 respectively are just about to be opened to begin the induction cycle. In the embodiment shown therein the primary and secondary intake ports 28 and 30 and 36 and 38 respectively are so disposed in the end walls 14 and 16 respectively that they are simultaneously opened into a working chamber during the engine operating cycle only after the exhaust cycle in the working chamber such as in the working chamber A has been completed. The primary intake ports 28 and 30 and the secondary intake ports 36 and 38 are so disposed in the end walls 14 and 16 respectively that the primary intake ports 28 and 30 are covered by the rotor 20 earlier than the secondary intake ports 36 and 38 during a late portion of the intake phase of the working chamber A. This is shown in FIG. 6 by a solid line position of the rotor 20, wherein the primary intake port 28 has been just covered, while the secondary intake port 36 is still uncovered. A dashed-line position of the rotor 20 in the same figure shows that the secondary intake port 36 has just been covered by the rotor 20.

The primary induction branch channels 24 and 26 are branched off from a common primary induction channel (no numeral) and the secondary induction branch channels 32 and 34 are branched off from a common secondary induction channel (no numeral). Both the common primary induction and secondary induction channels are supplied with air-fuel mixture from a conventional two-barrel carburetor indicated by a reference numeral 40. The two-barrel carburetor 40 is so adjusted that the common secondary induction channel is closed until the load on the engine exceeds a predetermined value, while the common primary induction channel is opened. When the load increases beyond the predetermined value, the common secondary induction channel is opened to feed air-fuel mixture into a working chamber through the secondary induction branch channels 32 and 34 and the secondary intake ports 36 and 38.

What is claimed is:

1. A rotary combustion engine, comprising a housing having a cavity therein having an axis, a rotor disposed within said cavity and rotatable relative to said housing about an axis spaced from but parallel to said cavity axis, said housing having axially spaced end walls and a peripheral wall interconnecting said end walls to form said cavity, the inner surface of said peripheral wall having a multi-lobed profile which is basically an epitrochoid, said rotor having end faces disposed adjacent to said end walls for sealing cooperation therewith and having a multi-lobed peripheral surface with a plurality of circumferentially spaced apex portions, an apex seal member carried by each of said apex portions and engaging the inner surface of said peripheral wall in sealing relation to form a plurality of working chambers between said housing and said rotor which vary in volume upon rotation of said rotor relative to said housing and, said housing having a primary intake port of relatively small cross-sectional area opening at one of said end walls into said cavity, said housing having a secondary intake port of relatively larger cross-sectional area than said primary intake port and opening at said same end wall into said cavity, said primary intake port being so disposed in said end wall that it is covered by said rotor earlier than said secondary intake port during a late portion of an intake phase of said engine.

2. A rotary combustion engine as claimed in claim 1, wherein said primary and said secondary ports are so disposed in said end wall that they are open into a working chamber during the operating cycle only after the exhaust cycle in said working chamber has been completed.

3. A rotary combustion engine as claimed in claim 1, wherein said primary and said secondary intake ports are so disposed in said end wall that they are simultaneously open into a working chamber during the operating cycle only after the exhaust cycle in said working chamber has been completed.

* * * * *